(12) United States Patent
Runde

(10) Patent No.: US 11,332,044 B2
(45) Date of Patent: May 17, 2022

(54) MANUAL PITCH EASY-ENTRY SEAT WITH POWER RETURN

(71) Applicant: Magna Seating Inc., Aurora (CA)

(72) Inventor: David Runde, Ortonville, MI (US)

(73) Assignee: Magna Seating Inc, Aurora (CA)

( * ) Notice: Subject to any disclaimer, the term of this patent is extended or adjusted under 35 U.S.C. 154(b) by 0 days.

(21) Appl. No.: 17/058,695

(22) PCT Filed: May 28, 2019

(86) PCT No.: PCT/US2019/034141
§ 371 (c)(1),
(2) Date: Nov. 25, 2020

(87) PCT Pub. No.: WO2019/227094
PCT Pub. Date: Nov. 28, 2019

(65) Prior Publication Data
US 2021/0197693 A1    Jul. 1, 2021

Related U.S. Application Data

(60) Provisional application No. 62/817,127, filed on Mar. 12, 2019, provisional application No. 62/676,374, filed on May 25, 2018.

(51) Int. Cl.
*B60N 2/02* (2006.01)
*B60N 2/06* (2006.01)
*B60N 2/16* (2006.01)

(52) U.S. Cl.
CPC .......... *B60N 2/0232* (2013.01); *B60N 2/067* (2013.01); *B60N 2/164* (2013.01); *B60N 2/1615* (2013.01); *B60N 2002/0236* (2013.01)

(58) Field of Classification Search
CPC .... B60N 2/0232; B60N 2/067; B60N 2/1615; B60N 2/164; B60N 2002/0236
(Continued)

(56) References Cited

U.S. PATENT DOCUMENTS 2,963,075 A * 12/1960 Clydeh ............... B60N 2/0232
248/430
8,424,969 B2    4/2013 Kammerer
(Continued)

FOREIGN PATENT DOCUMENTS

EP          0669220       8/1995
EP          1046536 A2 * 10/2000 ............. B60N 2/085
(Continued)

*Primary Examiner* — Mark R Wendell
(74) *Attorney, Agent, or Firm* — Miller Canfield

(57) ABSTRACT

An automotive seat assembly includes a manual system to slide the seat assembly from a seating position to a pitch easy entry position. The seat assembly includes a power return device to automatically return the seat assembly from the pitch easy-entry position back to the seating position wherein the power return device may be a module that may be added onto an existing seat assembly having manual pitch easy-entry features. The power return device is disengaged during forward slide and pitch of the seat assembly to the easy-entry position, but may then be actuated to control the return slide and return pitch of the seat assembly rearwardly to the seating position. If either the return slide feature or rearward pitch, feature is blocked or obstructed, the power return device disengages the obstructed feature and allows the remaining unobstructed feature to continue operating to complete the return slide or return pitch until such time as the blockage or obstruction is removed or the power return device is disengaged.

20 Claims, 12 Drawing Sheets

(58) Field of Classification Search
USPC .................................................. 297/344.13
See application file for complete search history.

(56) References Cited

U.S. PATENT DOCUMENTS

2004/0164218 A1* 8/2004 Yokota .................. B60N 2/067
248/430
2018/0105075 A1 4/2018 Runde

FOREIGN PATENT DOCUMENTS

| EP | 2243657 | | 10/2010 |
|----|---------|---|---------|
| EP | 3290261 | | 8/2016 |
| EP | 3162618 | | 10/2016 |
| KR | 20090025600 | * | 3/2009 |
| WO | 2015066683 | | 5/2015 |

* cited by examiner

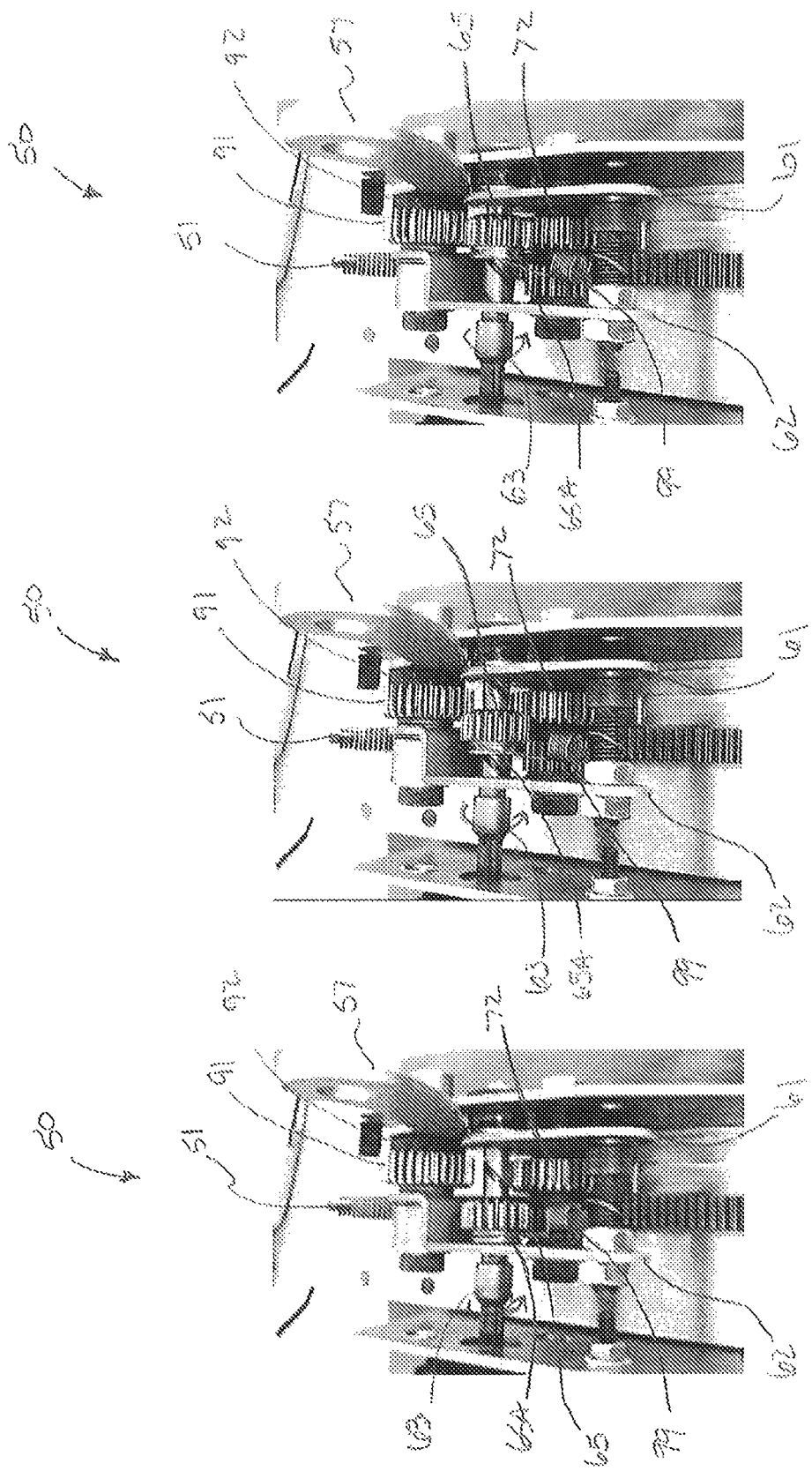

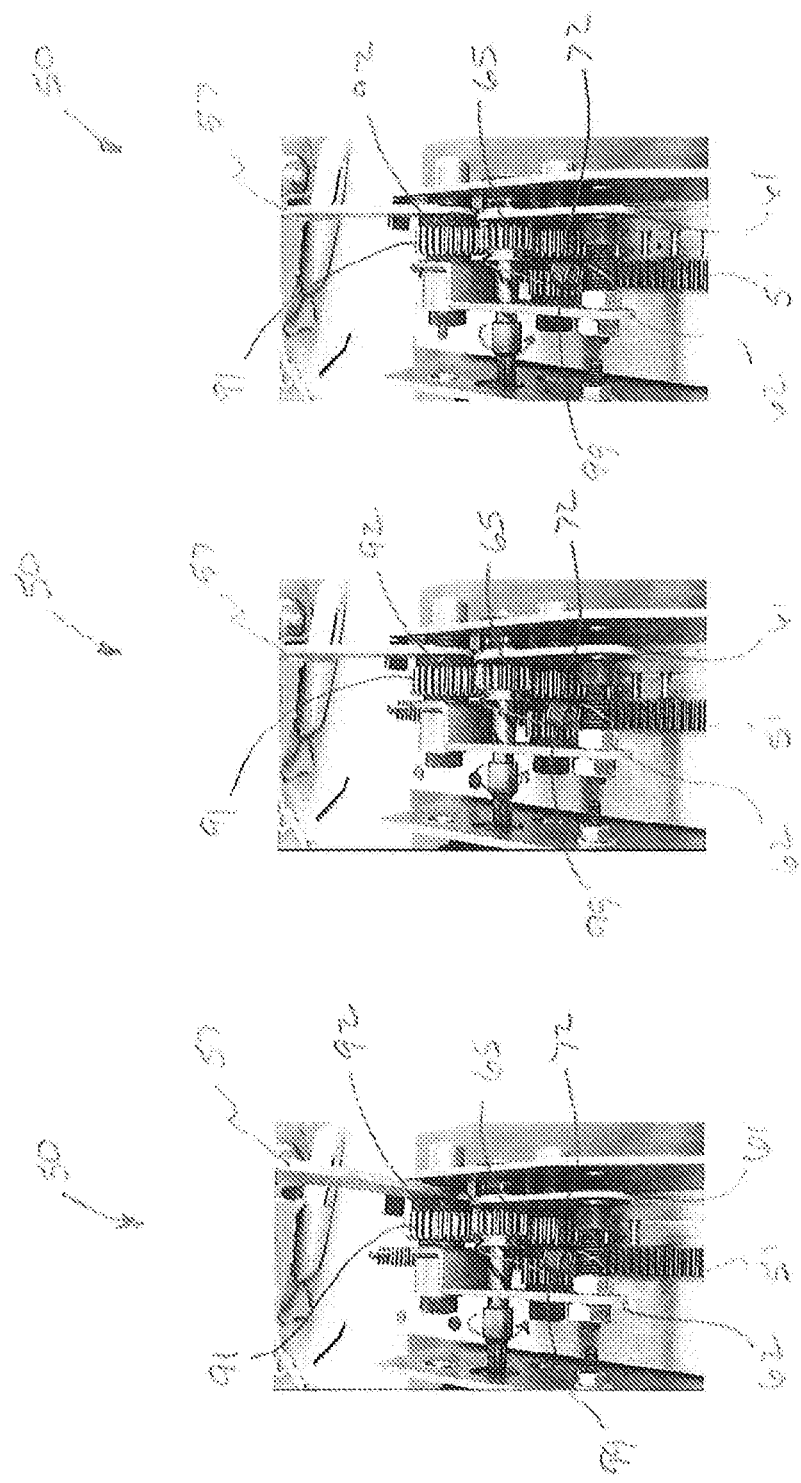

MANUAL PITCH EASY-ENTRY SEAT WITH POWER RETURN

CROSS-REFERENCE TO RELATED APPLICATIONS

This application claims priority to U.S. Provisional Patent Application No. 62/676,374, filed May 25, 2018, and U.S. Provisional Patent Application No. 62/817,127, filed Mar. 12, 2019, the disclosures of which are incorporated herein by reference in their entirety.

FIELD OF THE INVENTION

The invention relates to vehicle seat which is manually movable from a seating position to an easy-entry position to permit entry to an additional row of seating, and more particularly, to a vehicle seat having a power return device for automatically returning the seat assembly from the easy-entry position to the seating position.

BACKGROUND OF THE INVENTION

Automotive vehicles typically include one or more seat assemblies having a seat cushion and a seat back for supporting passengers above a vehicle floor. In a vehicle with three rows of seating, the second row seats are often configured to be movable from a seating position to an easy-entry position to allow for occupant ingress and egress to the third row of seating in the vehicle. There are several commonly known second row seat assemblies with various functionalities to achieve different easy-entry positions. These known functionalities include fold and tumble, tip slide, stand up, and pitch forward, all as are commonly known in the art. Once example of a second row seat assembly with pitch forward easy-entry functionality is shown in U.S. Pat. No. 8,424,969.

In a typical easy-entry seat assembly, the seat is mounted to the floor of the vehicle by a seat track assembly for providing fore and aft sliding adjustment of the seat. The seat cushion is pivotally connected to the seat track assembly by a plurality of pitch legs. The seat back is pivotally connected to the seat cushion by a recliner mechanism for providing selective pivotal movement of the seat back relative to the seat cushion between the seating position and a fold flat position overlying the seat cushion. The seat assembly is manually movable from the seating position to a pitch easy-entry position by tilting or pitching the seat upwardly and forwardly via the pitch legs and sliding the seat forward via the seat track assembly. The recliner mechanism remains locked to prevent pivotal movement of the seat back relative to the seat cushion. Further, movement of the seat assembly from the seating position to the easy-entry position is typically assisted by a one or more counterbalance springs to 1) bias the seat assembly towards the easy-entry position, and 2) lift the weight of the seat during the pitch forward movement. However, when it is desirable to return the seat assembly from the easy-entry position back to the seating position, the occupant must overcome both the weight of the seat and the biasing forces of the counterbalance springs.

Therefore, it is desirable to provide a pitch easy-entry seat with a power return device for automatically moving the seat from the pitch easy-entry position to the seating position.

SUMMARY OF THE INVENTION

A power return device is provided for returning a seat assembly for a vehicle from an easy-entry position to a seating position. The seat assembly is movable forwardly and rearwardly through slide and pitch movements to slide and pitch forwardly when moved from the seating position to said easy-entry position and to automatically slide and pitch rearwardly when returned to said seating position by the power return device. The power return device comprises a gear rack which is stationary during forward and rearward seat movement and a drive assembly mountable to the seat assembly and movable along the gear rack during the slide and pitch movements of the seat assembly. The drive assembly comprises a motor, at least a first pitch link drivingly connectable to the seat assembly so as to rotate during the pitch movements of the seat assembly, and a gear set assembly driven by the motor and drivingly connected to the first pitch link to rearwardly drive a return pitch of the seat assembly from the easy-entry position to the seating position and to rearwardly drive a return slide of the seat assembly from the easy-entry position to the seating position. The motor is releasably engagable with the gear set assembly wherein the motor is disengaged during forward slide and pitch movements of the seat assembly. The motor is drivingly engaged with the gear set assembly during return of the seat assembly from the easy-entry position to the seating position wherein the motor drives the return slide along the gear rack and the return pitch by controlled rotation of the first pitch link.

BRIEF DESCRIPTION OF THE DRAWINGS

The present disclosure will be readily appreciated as the same becomes better understood by reference to the following detailed description when considered in connection with the accompanying drawings wherein:

FIG. 16 is a front top perspective view showing the power return device with the drive pinion in the first position;

FIG. 17 is a front top perspective view showing the power return device with the drive pinion moving between the first position and the second position;

FIG. 18 is a front top perspective view showing the power return device with the drive pinion almost in the second position;

FIG. 19 is a front top perspective view showing the power return device with the drive pinion fully displaced to the second position to displace the power return device rearwardly and return the seat assembly to the seating position;

FIG. 20 is a front top perspective view showing the power return device with the drive pinion moving the power return device and the pitch link rearwardly;

FIG. 21 is a front top perspective view showing the power return device after the drive pinion moves the power return device and the pitch link rearwardly;

Figures 1, 2:
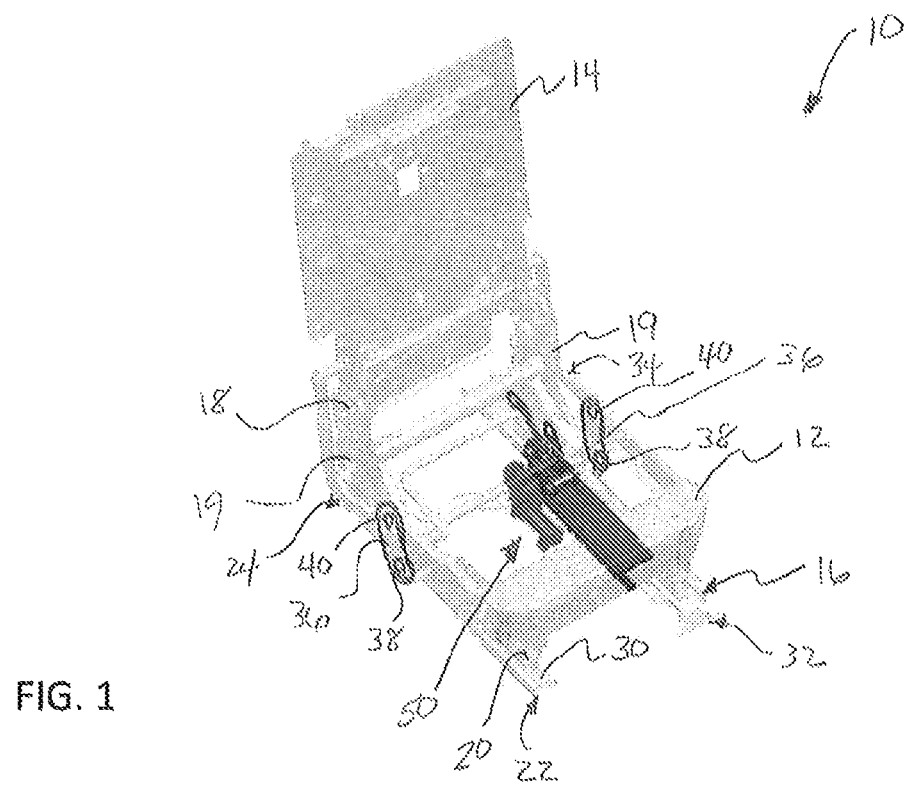
FIG. 1 is a perspective view of a seat assembly, which is adapted to be slidably mounted by a seat track assembly to a vehicle and includes a power return device according to a first embodiment of the present invention.
FIG. 2 is a front perspective view of the power return device.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION OF THE PREFERRED EMBODIMENTS

Referring to the Figures, wherein like numerals indicate like or corresponding parts throughout the several views, a seat assembly for use in an automotive vehicle is generally shown at 10. Referring to FIGS. 1-4, the seat assembly 10 includes a generally horizontal seat cushion 12 and a generally upright seat back 14 operatively coupled to the seat cushion 12. Each of the seat cushion 12 and seat back 14 include a structural frame for supporting a cellular foam pad encased in a textile trim cover as is commonly known in the art. Further, the seat back 14 is typically operatively coupled to the seat cushion 12 by a recliner mechanism 18 for providing selectively pivotal movement of the seat back 14 relative to the seat cushion 12 between an upright seating position, a plurality of reclined positions, and a fold flat position overlying the seat cushion 12. The seat assembly 10 is adapted to be mounted to a floor of the vehicle by a seat track assembly 16 for providing fore and aft sliding movement of the seat assembly 10 along the vehicle floor. The seat cushion 12 includes a pair of spaced apart seat cushion brackets 19 operatively coupled to the seat back 14 by the recliner mechanism 18 and also operatively coupled to the seat track assembly 16.

Figure 3:
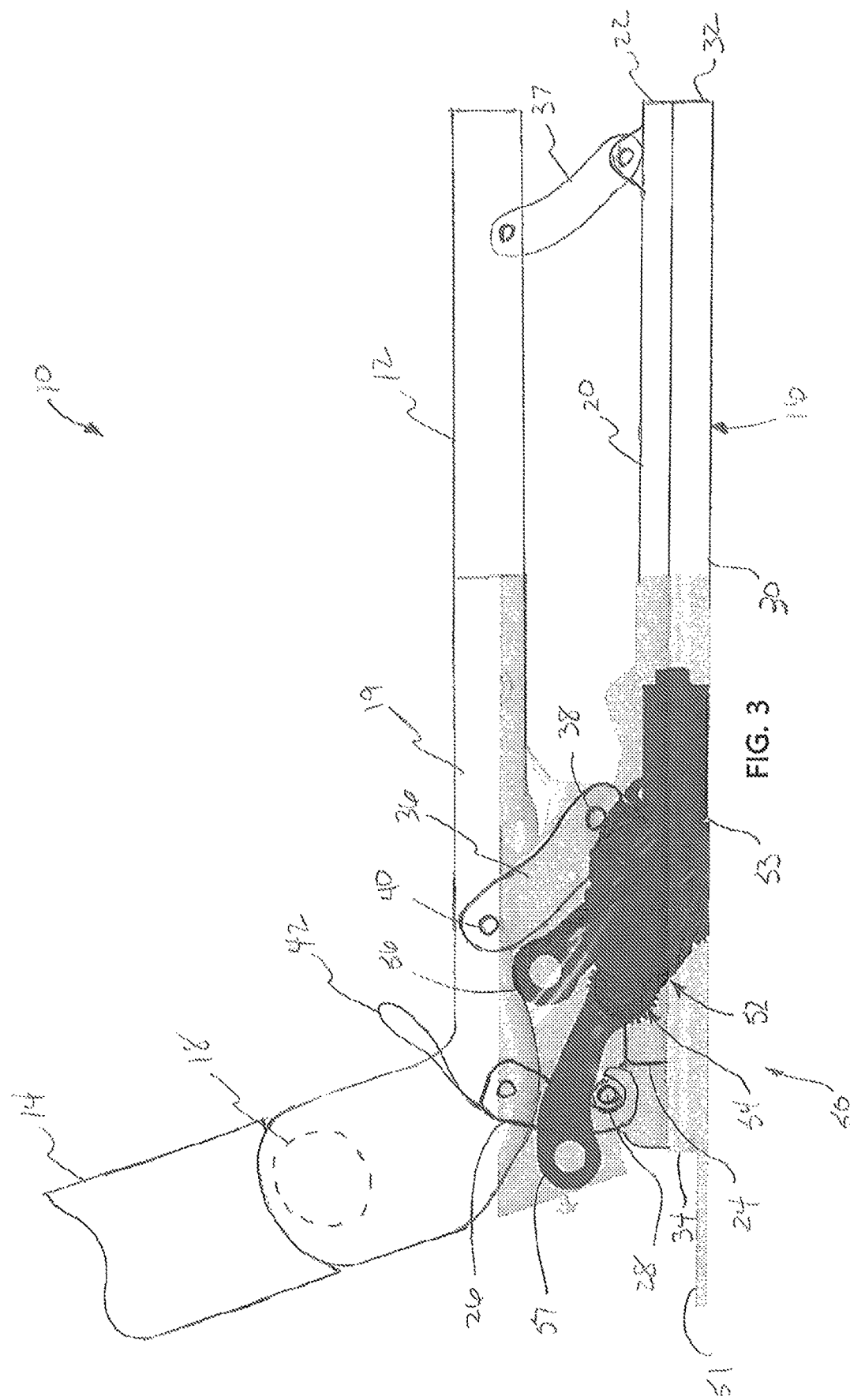
FIG. 3 is a fragmentary side view of the seat assembly and power return device in the seating position.
Figure 4:
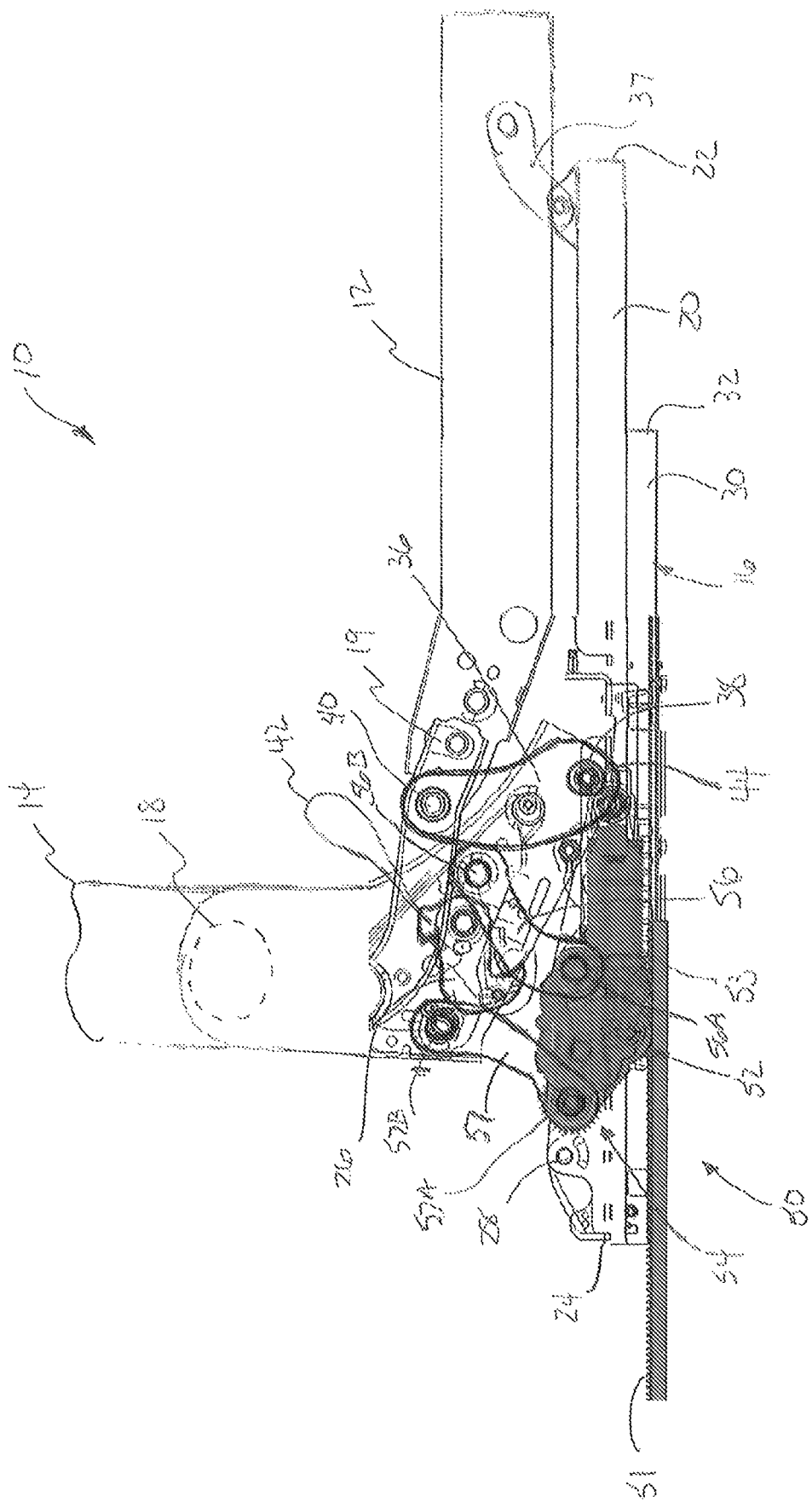
FIG. 4 is a fragmentary side view of the seat assembly and power return device in the pitch easy-entry position.

The seat track assembly 14 includes a pair of spaced apart and parallel upper rails 20 extending between opposite forward and rearward ends 22, 24 and slidably coupled to a corresponding pair of spaced apart and parallel lower rails 30 extending between corresponding forward and rearward ends 32, 34. The lower rails 30 are adapted to be fixedly secured to the vehicle floor by mounting brackets and/or bolts. Referring to FIGS. 3 and 4, a generally hook-shaped striker latch 26 is pivotally coupled to the seat cushion bracket 19 for releasable engagement with a transverse striker bar 28 fixedly secured to the rearward end 34 of the lower rail 30 for selectively locking the seat assembly 10 in the seating position. A pair of easy-entry rear pitch legs 36 spaced laterally along opposite sides of the seat cushion 12 extends between a first end pivotally coupled to the seat track assembly 16 at pivot 38 and an opposite second end pivotally coupled to the seat cushion bracket 19 at pivot 40. A pair of easy-entry front pitch legs 37 are also spaced laterally along opposite sides of the seat cushion 12 and pivotally extend between the forward ends of the seat track assembly 16 and the seat cushion 12.

The seat assembly 10 may further include an easy-entry release mechanism 42, such as a release strap or handle, coupled to the striker latch 26 for releasing the striker latch 26 from the striker bar 28 thereby allowing manual forward movement of the seat assembly 10 between the seating position (FIGS. 1 and 3) and the easy-entry position (FIG. 4). More specifically, actuation of the release mechanism 42 pivotally releases the striker latch 26 from engagement with the striker bar 28. The seat assembly 10 is then manually slidable via the seat track assembly 16 as the upper rails 20 slide longitudinally forward along the lower rails 30 towards the front of the vehicle. When the seat assembly 10 reaches it forward-most position along the track assembly 16, the seat assembly 10 then also pitches or tilts upwardly and forwardly via the front and rear pitch legs 36, 37 lifting the rear portion of the seat assembly 10 upwardly away from the vehicle floor to the pitch easy-entry position to provide more space for ingress and egress to the third row of seating positioned within the vehicle behind the seat assembly 10. The seat assembly 10 also includes one or more counterbalance springs 44 operatively coupled between the seat track assembly 16 and the rear pitch legs 36 for biasing the seat assembly 10 toward the easy-entry position and for lifting and counterbalancing the weight of the seat assembly 10. One or more counterbalance springs may also be operatively coupled between the upper rails 20 and lower rails 30 of the seat track assembly 16 for biasing the seat assembly 10 forwardly along the seat track assembly 16 towards the front of the vehicle to the easy-entry position.

Referring to FIGS. 1 and 2, the seat assembly 10 also includes a power return device 50 according to a first embodiment of the present invention. The power return device or mechanism 50 preferably is a module that may be added onto the existing manual seat assembly 10 of a vehicle to automatically return the seat assembly 10 from the pitch easy-entry position to the seating position. That is, the power return device 50 overcomes the bias of the counterbalance springs 44 and the weight of the seat assembly 10 to automatically return the seat assembly 10 from the easy-entry position back to the seating position. During regular operations of the seat assembly 10, the power return device 50 is not engaged or actuated but moves with and permits the manual fore and aft sliding and pitch forward movement of the seat assembly 10. Once the power return device 50 is actuated, as described herein, it operates to automatically return the seat assembly 10 to the seating position.

Figure 5:
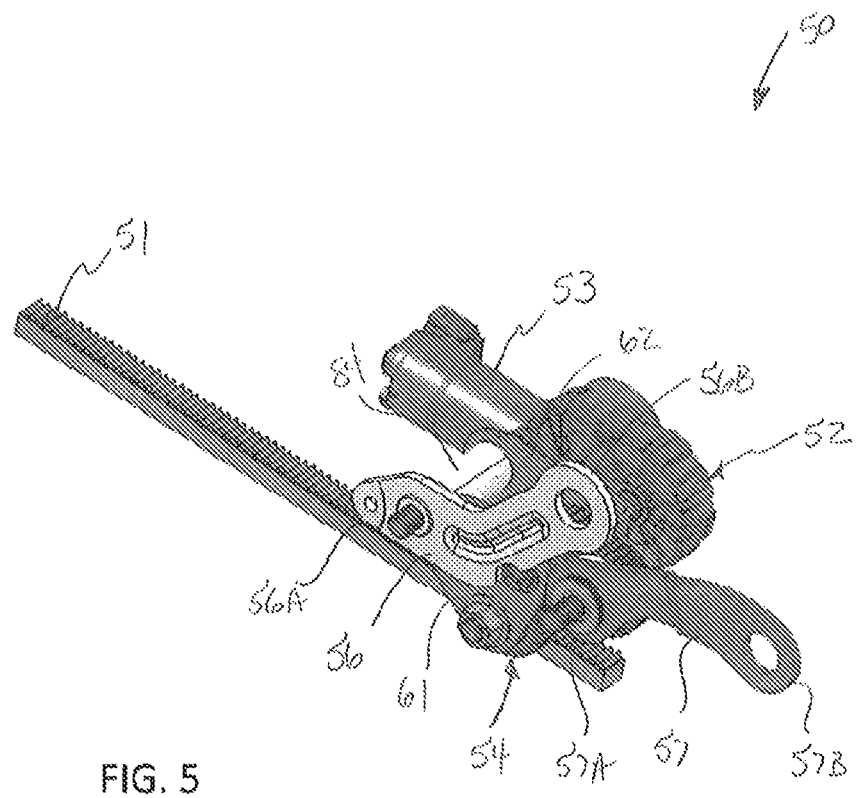
FIG. 5 is a side perspective view of the power return device taken from the rear wherein the power return device is configured with the seat assembly in the seating position.
Figure 6:
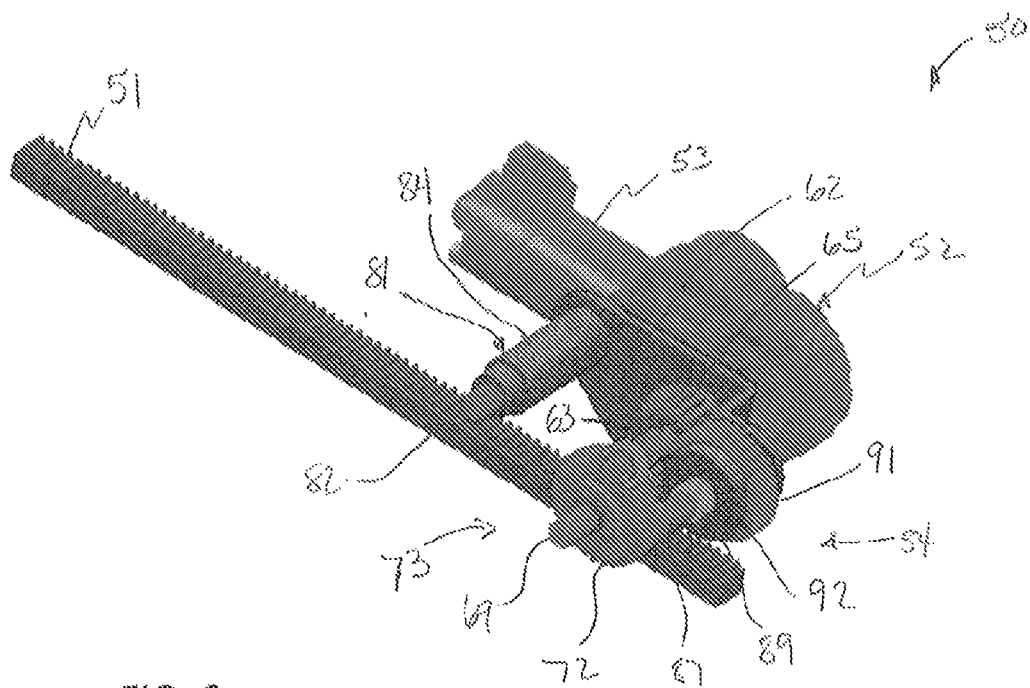
FIG. 6 is a side perspective view of the power return device of FIG. 5 with a first bracket and a front pitch link removed and further including a drive pinion, a rack pinion, a pitch link drive gear, and a rack pinion drive gear mounted on a second bracket.

Referring to FIGS. 2 and 5, the power return device 50 is shown separate from the seat assembly 50 but is mountable to the seat assembly 10 as shown in FIGS. 1, 3 and 4. In particular, the power return device 50 includes a guide rail formed as a gear rack 51 that is mountable to the stationary components of the seat assembly 10 such as the lower rails 30 of the seat track assembly 16. The power return device 50 also includes a movable drive assembly 52 that is mountable to the movable components of the seat assembly 10 such as the seat cushion bracket 19 so as to slide forwardly and rearwardly with the seat cushion 12, and articulate during forward pitching of the seat assembly 10 from the seating position to the pitch easy-entry position.

The drive assembly 52 comprises a motor 53, a gear set assembly 54, and front and rear pitch links 56 and 57. The pitch links 56 and 57 have respective lower link ends 56A and 57A, which rotatably engage the gear set assembly 54, and upper link ends 56B and 57B, which rotatably connect to the seat cushion bracket 19 to travel with the seat cushion 12 during articulating of the seat assembly 10 between the seating position and easy-entry position. As seen in FIG. 3, the pitch links 56 and 57 are rotated and oriented to the rear and downwardly toward the floor when the seat assembly 10 is in the seating position. As seen in FIG. 4, the pitch links 56 and 57 have their lower ends 56A and 57B connected to the gear set assembly 54 while the upper ends 56B and 57B displace with the seat cushion 12 so as to rotate upwardly and forwardly when the seat assembly 10 is displaced to the pitch easy-entry position. During this movement, the drive assembly 52 moves forwardly and rearwardly with the seat assembly 10 relative to the gear rack 51.

Generally, the power return device 50 is disengaged or decoupled from the manual slide and pitch systems (i.e. the track assembly 16 and pitch legs 36, 37) when the seat assembly is manually moved to the easy-entry position. When disengaged, the gear set assembly 54 freely moves along the gear rack 51 and the links 56 and 57 may freely rotate with the movement of the seat cushion 12. However, upon demand by an operator to return the seat assembly 10 to the seating position, the power return device 50 actuates to an engaged position which effectively engages the power return device 50 with the slide and pitch systems by selective engagement of the gear set assembly 54. When the motor 52 and gear set assembly 54 are engaged, operation of the motor 52 drives the gear set assembly 54 along the gear rack 51 to drive the seat assembly 10 rearwardly and drives the pitch links 56 and 57 rearwardly to drive the seat cushion 12 back to the seating position. As such, the power return device 50 is disengaged during forward sliding and pitching of the seat assembly 10 to the easy-entry position, but may then be actuated by vehicle controls and the motor 52 to automatically drive and return the seat assembly 10 to the seating position. Operation of the power return device 50 may be achieved through controlled operation of the motor 52 through suitable switching and control circuits.

Referring now to FIGS. 5-12, the motor 52 is operatively connected to the gear set assembly 54. The gear set assembly 54 comprises first and second support brackets 61 and 62, which are joined in spaced relation to define an interior gear space.

Figure 7:
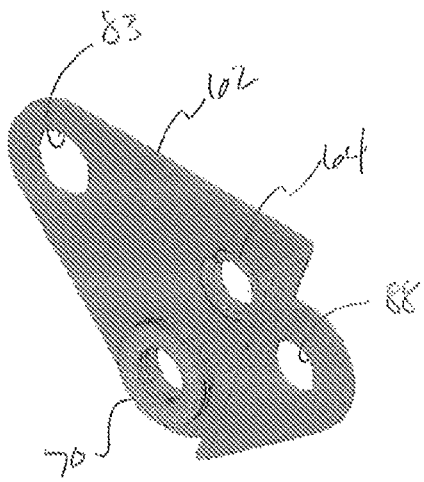
FIG. 7 is a side perspective view of the second bracket of the power return device.
Figure 8:
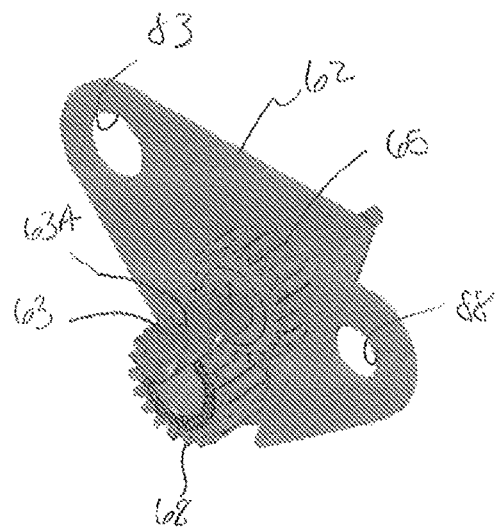
FIG. 8 is a side perspective view of the second bracket including a helical drive shaft and the drive pinion and rack pinion.
Figure 9:
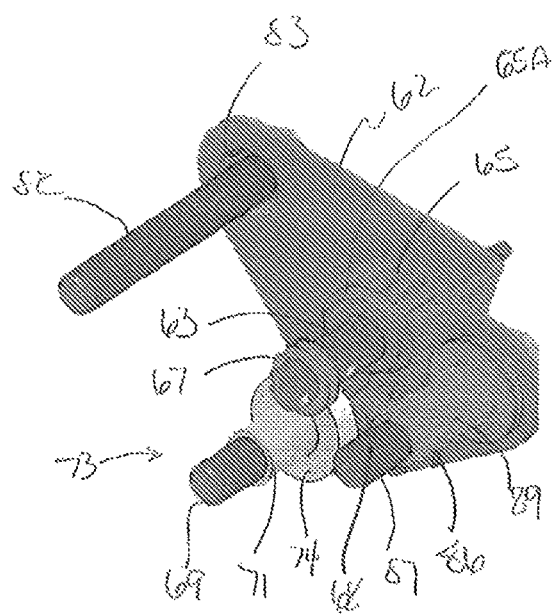
FIG. 9 is a side perspective view of the second bracket of FIG. 8 and further including several shafts and a rack pinion friction pad supported thereon.
Figure 11:
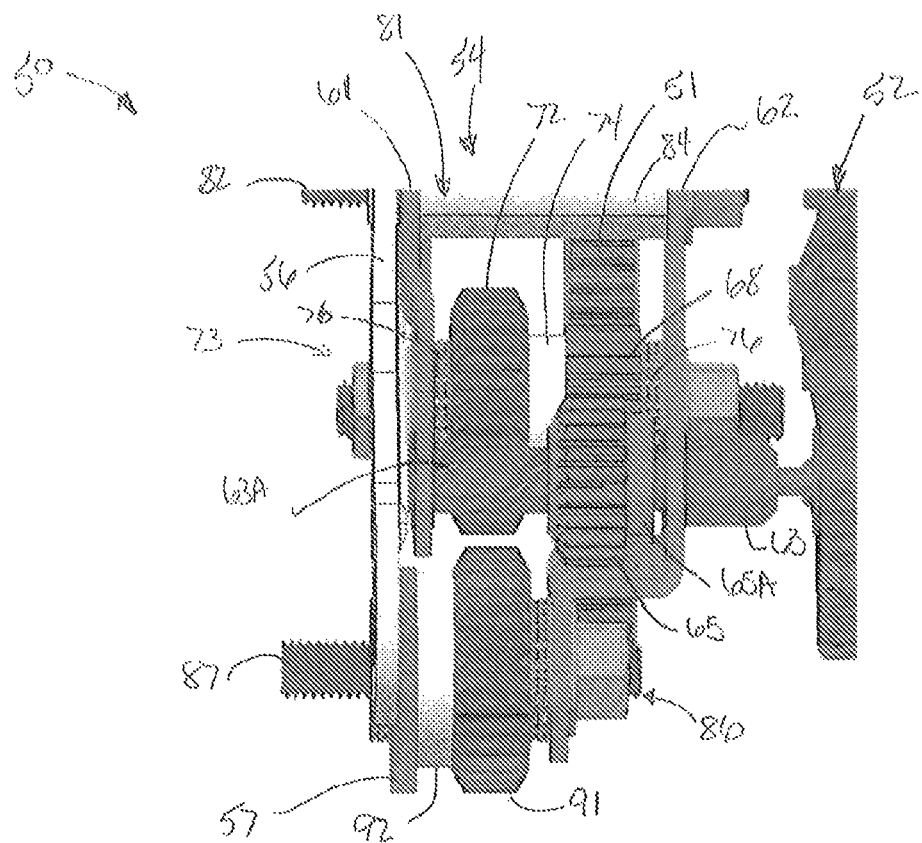
FIG. 11 is an end view of the power return device with the drive pinion in a first position decoupled from the rack pinion drive gear and the pitch link drive gear.
Figure 12:
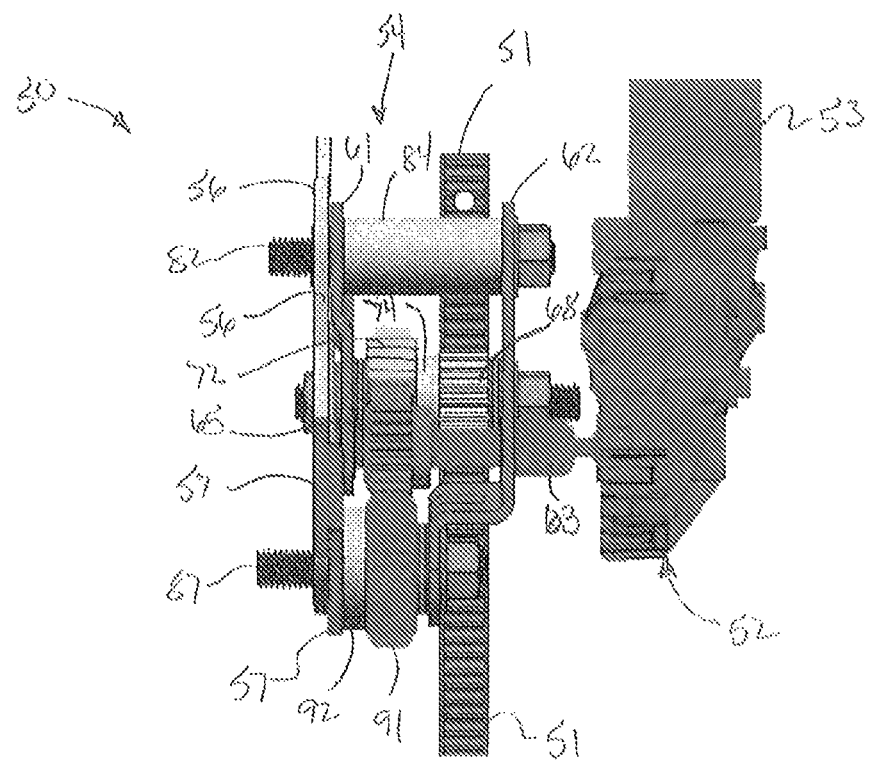
FIG. 12 is an end view of the power return device with the drive pinion in a second position engaged with the rack pinion drive gear and the pitch link drive gear.

The second support bracket 62 is disposed adjacent to the motor 52 and rotatably receives a drive shaft 63 through drive shaft bushing 64 (FIG. 7). The drive shaft 63 is preferably formed as a helical drive shaft having a helical drive slot 63A, the function of which will be more fully appreciated below. The drive shaft 63 also operatively supports a drive pinion 65 formed with drive teeth on an outer circumference thereof. The drive pinion 65 has an inner bore that operatively mates with the drive slot 63A so that rotation of the drive shaft 63 causes the drive pinion 65 to travel axially along the length of the drive slot 63A (as generally seen in FIGS. 11 and 12) and eventually causes the drive pinion 65 to rotate. The drive pinion 65 is located in an inactive first position (FIG. 11) but is movable to an active second position (FIG. 12).

The outer end of the drive shaft 63 has a shaft bushing 67 (FIG. 9) to stop axial travel of the drive pinion 65 and thereby engage the motor 52 with the remaining components of the gear set assembly 54. Once axial travel is stopped by the shaft bushing 67, the drive pinion 65 then rotates with the drive shaft 63 to engage and drive the remainder of the gear set assembly 54. Reverse rotation of the drive shaft 63 causes the drive pinion 65 to travel axially back toward the motor 52 to thereby disengage the gear set assembly 54 from the motor 52. To prevent rotation of the drive pinion 65 during this axial travel between the first and second positions, the drive pinion 65 includes an outer hub 65A coupled to a tensioner spring 99 (FIGS. 16-18), which biases the drive pinion radially 65 relative to the shaft 63 so that shaft 63 rotation causes the drive pinion 65 to travel along the slot 63A between the first and second position rather than rotate. When the drive pinion 65 is stopped at the bushing 67 in the second position, a rotative driving force of the shaft 63 overcomes the axial driving force so that the drive pinion 65 now rotates with the drive shaft 63. When the drive pinion 65 is moved back toward the motor 52, the axial driving force from the tensioner spring 99 acting on the outer hub 65A overcomes the rotative driving force during reverse motor rotation to transfer the drive pinion 65 axial along the drive shaft 63 to the first position.

Figure 10:
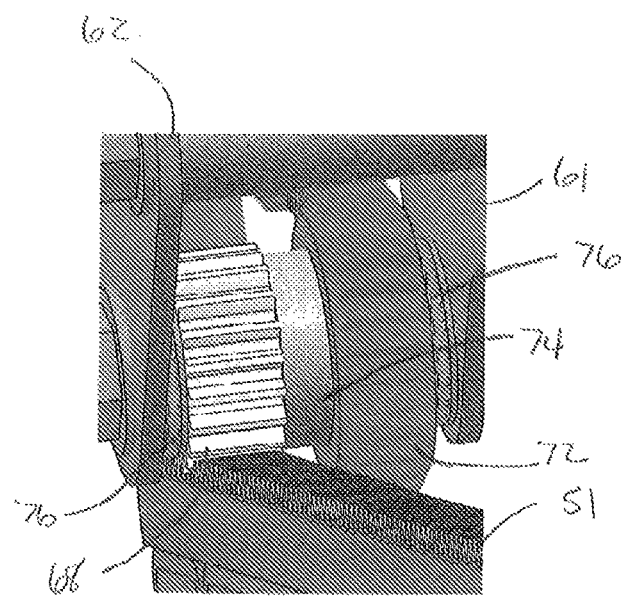
FIG. 10 is a fragmentary front perspective view of the rack pinion in meshing engagement with a gear rack and drivingly engaged with the rack pinion drive gear by an axial joint preferably defined by the rack pinion friction pad disposed axially therebetween.

To control or drive the return sliding movement of the seat assembly 10, the support bracket 62 includes a rack pinion 68 (FIGS. 8 and 10) that meshingly engages with the gear rack 51 as seen in FIG. 10. The rack pinion 68 is rotatably supported on a pinion shaft 69 supported on the support bracket 62 by a gear shaft bearing 70 (FIG. 7). The pinion shaft 69 is formed as a bolt secured between the brackets 61 and 62 and having a cylindrical spacer 71 which rotatably supports the rack pinion 68. The spacer 71 in turn supports a rack pinion drive gear 72 on the outer end thereof which is mated to the rack pinion 68 by a high pressure axial joint 73 preferably formed by a friction pad 74 (FIGS. 9 and 10) or in the alternative a slip bushing. The friction pad 74 is in contact with and compressed between the rack pinion drive gear 72 and rack pinion 68 to normally form a friction interface whereby rotation of the rack pinion drive gear 72 causes rotation of the rack pinion 68 to thereby drive the seat assembly 10 along the gear rack 51. This assembly stack further includes needle type roller bearings 76 to allow free rotation under high axial loading applied by the bolt and nuts forming the pinion shaft 69.

To drive the rack pinion 68, the outer teeth of the rack pinion drive gear 72 meshingly engage with the teeth of the drive pinion 65 when the drive pinion 65 is axially moved to the second drive position of FIG. 12. This engagement drives the return sliding movement of the seat assembly 10 during operation of the motor 52. However, the diameter of the rack pinion drive gear 72 is greater than the rack pinion 68 and the drive pinion 65 does not directly engage with the rack pinion 68. As such, when the drive pinion 65 is axially moved to the initial first position (FIG. 11), the drive pinion 65 is radially spaced apart from and cannot drive the rack pinion 68. In this in-operative condition, drive pinion 65 is decoupled from the gear rack 51 and thus the power return device 50 is disengaged from the slide system, i.e. track assembly 16. When disengaged, the seat assembly 10 can slide fully forward to the easy-entry position while the power return device 50 remains disengaged from such sliding movement. When engaged, rotation of the motor 52 drives rearward sliding or return movement of the seat assembly 10 to the seating position.

If sliding movement of the seat assembly 10 is blocked or obstructed in any manner so that the seat assembly 10 hits a hard stop, such as end of travel or an object blocking travel, the friction pad interface defined by the friction pad 74 allows slippage between the rack pinion 68 and rack pinion drive gear 72 to stop sliding of the seat assembly 10. In effect, the power return device 50 is disconnected from the slide system of the seat assembly 10. This slippage continues until the motor 52 is stopped such as by suitable control sensors or at the end of travel, or else, the obstruction is removed. During such slippage, the operation of the remaining components of the power return device 50 can continue by continued operation of the motor 52. Therefore, the axial joint 73 and friction pad 74 is normally connected but is intermittently released, similar to a clutch, when a hard stop is encountered.

Next, the axial movement of the drive pinion 65 also engages and disengages the power return device 50 from the pitch system. As such, the power return device 50 is decoupled or disengaged from the seat assembly 10 during articulated or pitch movement to the easy-entry position, and then is engaged to automatically drive return of the seat assembly 10 to the seating position.

In more detail as to FIGS. 5-9, the pitch links 56 and 57 are rotatably connected to the gear set assembly 54. First, as to the pitch link 56, the bracket 62 includes a first pivot shaft 81 formed with a bolt 82 supported on a bracket bore 83 and an outer cylindrical spacer 84. The spacer 84 is stepped on the outer end to rotatably support the pitch link 56, wherein the pitch link 56 rotates freely in response to pitching movement of the seat assembly 10.

Next, as to the pitch link 57, the bracket 62 also includes a second pivot shaft 86 formed with a bolt 87 supported on a bracket bore 88 and an outer cylindrical spacer 89. The outer end of the spacer 89 rotatably supports the pitch link 57, wherein the pitch link 56 is driven by the motor 54 to drive the return pitch function during return of the seat assembly 10 from the easy-entry position to the seating position. Referring to FIGS. 11 and 12, the pivot shaft 86 also includes a pitch link drive gear 91 which rotationally drives the pitch link 57 by an intermediate friction pad 92 axially compressed between the pitch link drive gear 91 and pitch link 57. The friction pad 92 essentially operates similar to the friction pad 74 by defining a high pressure axial joint between said pitch link 57 and the pitch link drive gear 91, wherein the axial joint and friction pad 92 is normally connected but is intermittently released, similar to a clutch, when a hard stop is encountered.

To drive the pitch link 57, the pitch link drive gear 91 is aligned next to but spaced radially from the rack pinion drive gear 72 so that the drive pinion 65 fits therebetween and can move into and out of engagement with both of the drive gears 72 and 91 at the same time. When meshingly disengaged as seen in FIG. 11, the drive gears 72 and 91 are free to rotate in response to manual forward slide and pitch of the seat assembly 10 to the easy-entry position. When meshingly engaged as seen in FIG. 12, the drive gears 72 and 91 rotate in response to motor operation of the drive pinion 65 so that the motor 52 controls the return slide and pitch of the seat assembly 10 to the seating position. Since the friction pad 92 essentially operates similar to the friction pad 74, slippage will occur between the friction pad 92 and rear pitch link 57 if the seat assembly 10 encounters an obstruction or hard stop that prevents rearward movement of the seat assembly 10 to the seating position.

With this improved design, the power return device 50 is disengaged or decoupled from the manual slide and pitch systems when the seat assembly 10 is manually moved to the easy-entry position. However, upon demand by an operator to return the seat assembly 10 to the seating position, the motor 52 is turned on and rotates the shaft 63 to axially move the drive pinion 65 in a cross car direction into meshed driving engagement with the rack pinion drive gear 72 and pitch link drive gear 91 (FIG. 12) so that the power return device 50 essentially moves to an engaged position with the slide and pitch systems. Further, motor rotation may be reversed to reverse rotate the shaft 63 and move the drive pinion 65 back to the inactive or decoupled position of FIG. 11. As such, the power return device 50 is disengaged during forward slide and pitch of the seat assembly 10 to the easy-entry position, but may then be actuated to automatically control the return slide and return pitch of the seat assembly 10 to the seating position. If either of the return slide or return pitch systems is blocked or obstructed, the power return device 50 may allow release of the obstructed system by slippage permitted by one or the other of the friction pads 74 and 92 and allow the remaining unobstructed system to continue operating until such time as the blockage or obstruction is removed.

Figure 13:
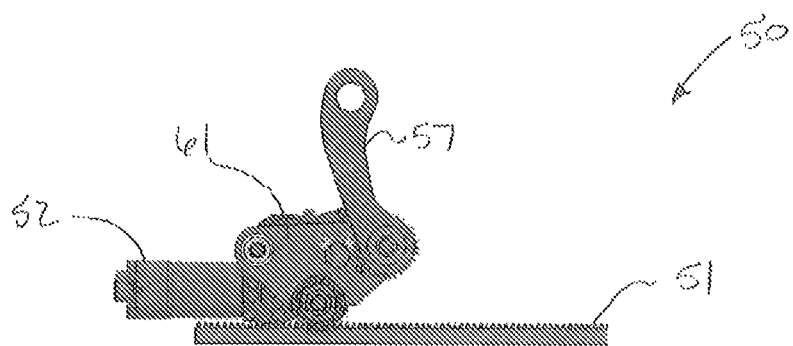
FIG. 13 is a side view of the power return device when displaced forwardly with the seat assembly in the easy-entry position toward the front of vehicle (FOV)
Figure 14:
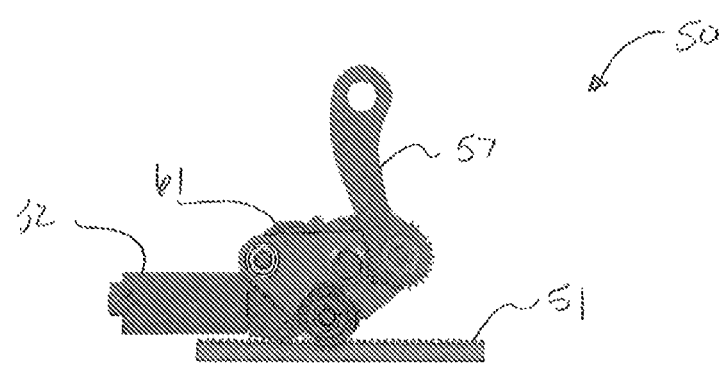
FIG. 14 is a side view of the power return device moving rearwardly toward the rear of vehicle wherein the drive pinion is engaged with the return gears comprised of the rack pinion drive gear and pitch link drive gear.
Figure 15:
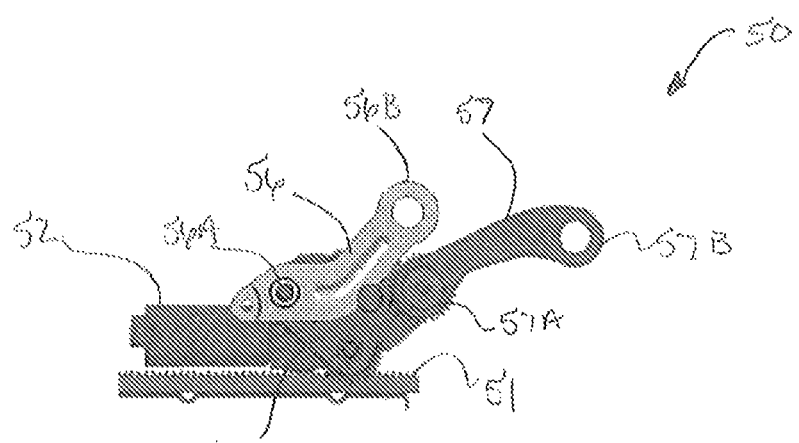
FIG. 15 is a side view of the power return device moved to its rearward position wherein the drive pinion has driven the rack pinion drive gear rearwardly and rotated the pitch link drive gear to rotate the pitch link and return the seat assembly to the seating position.

Referring to FIGS. 13-15, FIG. 13 shows the power return device 50 when displaced forwardly with the seat assembly 10 toward the front of vehicle (FOV) in the easy-entry position.

When return seat movement is desired as shown by FIG. 14, the power return device 50 is operated by turning on the motor 52 which engages the drive pinion 65 with the return gears defined by the rack pinion drive gear 72 and pitch link drive gear 91, which causes the power return device 50 and interconnected seat assembly 10 to move rearwardly.

FIG. 15 shows the power return device 50 moved to its rearward position wherein the drive pinion 65 has driven the rack pinion drive gear 72 and rotated the pitch link drive gear 91 to rotate the pitch link 57 rearwardly which also pulls the front pitch link 56 rearwardly and returns the seat assembly 10 to the seating position.

To illustrate the engagement of the drive pinion 65: FIG. 16 shows the drive pinion 65 in the first position; FIG. 17 shows the drive pinion 65 moving between the first position and the second position; and FIG. 18 shows the drive pinion 65 almost in the second position, although some axial space remains between the drive pinion 65 and drive shaft bushing 67. Notably, the tensioner spring 99 is shown connected between drive pinion 65 and an anchor preferably defined by shaft 81 to bias the drive pinion 65 radially as described above forcing the drive pinion 65 to move axial along the drive shaft 63 between the first and second positions.

FIG. 19 shows the drive pinion 65 fully displaced to the second position to displace the power return device 50 rearwardly by engagement with the rack pinion drive gear 72 which drives the rack pinion 68 to return the seat assembly 10 to the seating position. Once fully seated in the second position, the drive pinion 65 also engages with and drives the pitch link drive gear 91 and interconnected pitch link 57 rearwardly as seen in FIGS. 20 and 21.

Figure 23:
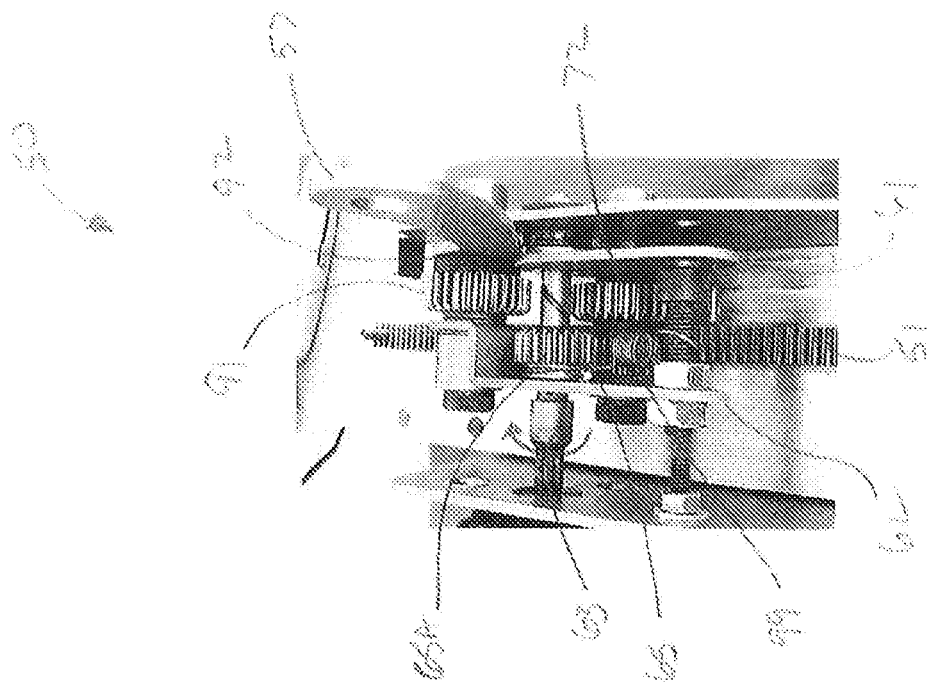
FIG. 23 is a front top perspective view showing the power return device with the drive pinion in the first position.
Figure 22:
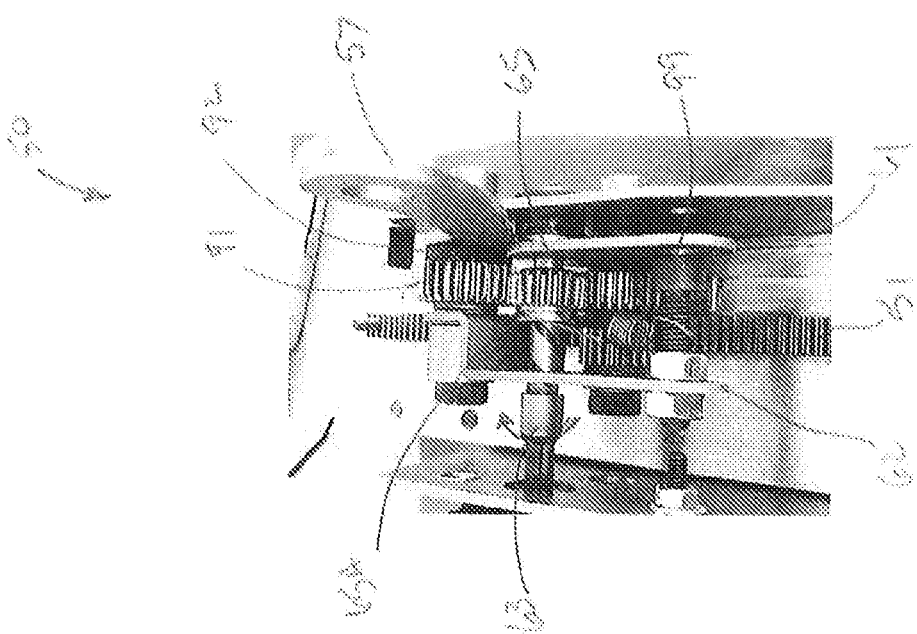
FIG. 22 is a front top perspective view showing the power return device with the drive pinion in the second position and a motor reversing to move the drive pinion back to the first position.

FIG. 22 shows the power return device 50 with the drive pinion in the second position wherein motor reversing moves the drive pinion 65 axially back to the first position (FIG. 23). FIGS. 22 and 23 also show the pitch link 57 in the forward position and remaining stationary which illustrates that the power return device 50 may be disengaged even if the pitch link 57 remains stationary such as by obstruction, wherein this feature is provided by the friction pad 92.

With this design, all electrical functions (engagement, system lock, automatic disengagement, etc.) preferably will be initiated with a one-touch button and controlled via micro switch/relay components or may be controlled via one-touch switch and an IC controller to accommodate high current draw requirements which may be experienced.

Figure 24:
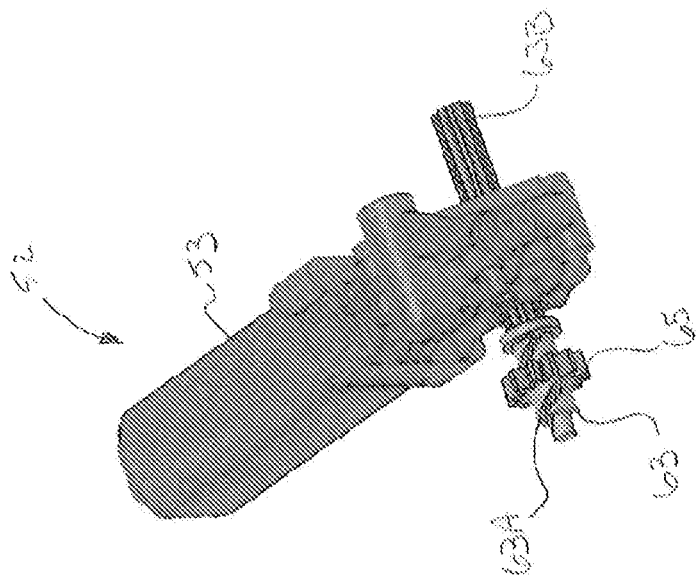
FIG. 24 is a rear perspective view of the motor of the first embodiment.
Figure 26:
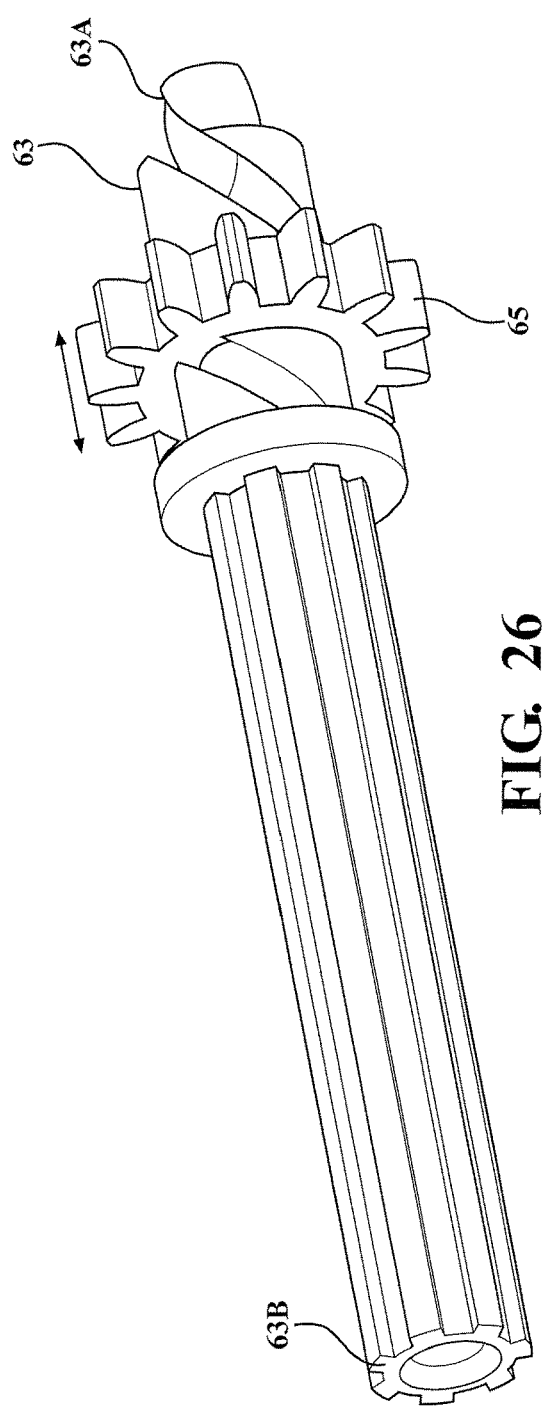
FIG. 26 is a rear perspective view of a helical drive shaft used in the motor of the first embodiment.

While the drive pinion 65 is axially movable due to movement of the drive pinion 65 along the drive shaft 63, the drive pinion 65 also may move together with a movable shaft in an alternate configuration. FIGS. 24 and 26 shows the drive pinion 65 on the shaft 63 which includes the drive slot 63A to thereby define a helix shaft. In this design, the shaft 63 includes a keyed shank 63B that fits into the motor 52 and is axially fixed in position during operation of the motor 52 so that the shaft 63 does not axially translate left and right relative to the fixed motor 52. Rather, it is the drive pinion 65 that translates left and right dependent upon the clockwise or counterclockwise motor rotation.

Figure 25:
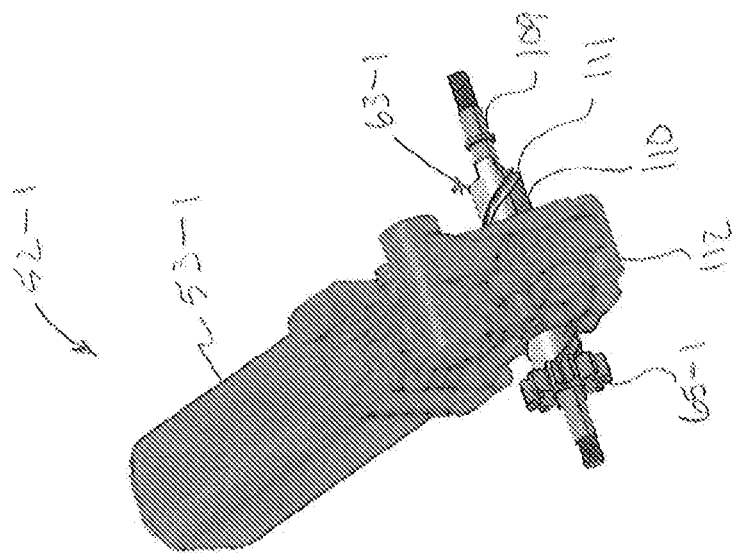
FIG. 25 is a rear perspective view of a motor according to a second embodiment of the present invention.
Figure 27:
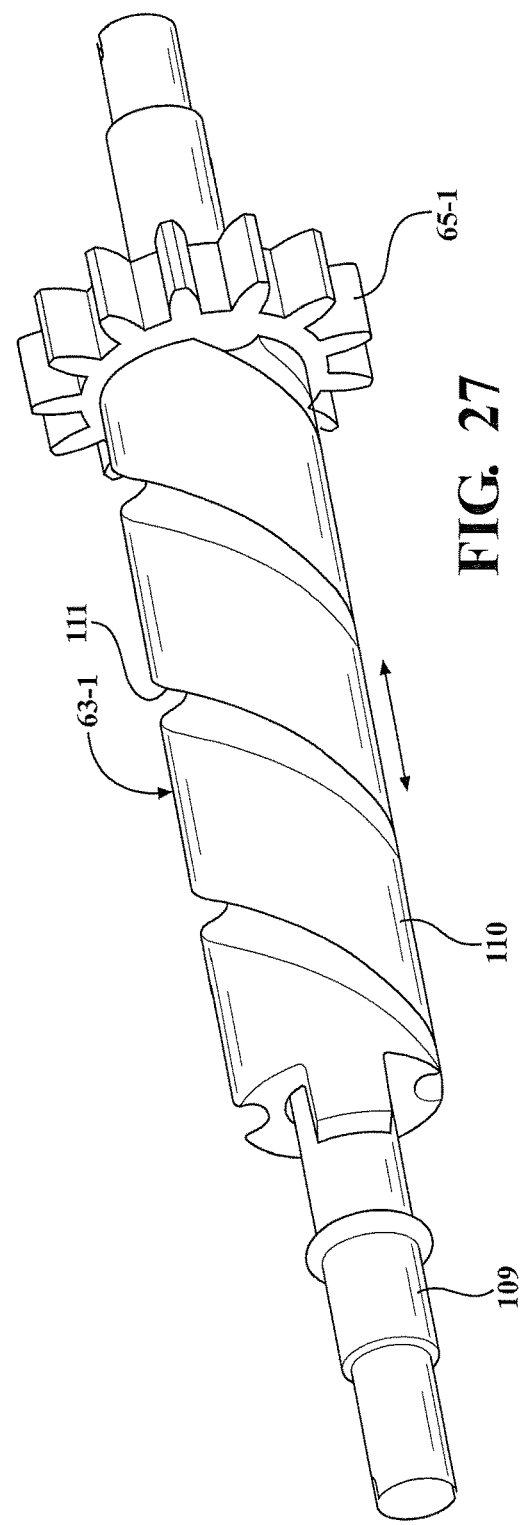
FIG. 27 is a rear perspective view of a variation of a helical drive shaft used in the motor of the second embodiment.

FIGS. 25 and 27 show an alternate configuration wherein the drive shaft 63-1 is rotatably engaged with the motor 52-1 and includes a drive pinion 65-1 on one end of the drive shaft 63-1. In this design, the motor 52-1 is still in a fixed location but the shaft 63-1 has a central shaft axle 109, which is fixed at opposite ends and rotates by the motor 52-1. The shaft 63-1 also has an outer shaft sleeve or helix tube 110, which is slidable on the shaft axle 109 in left and right directions relative to the motor 52-1. The drive pinion 65-1 is rigidly affixed to the shaft sleeve 110 so as to move axially therewith. The motor input drives the shaft 63-1 clockwise and counterclockwise during motor operations. The shaft sleeve 110 has a helical drive slot 111 which engages with a drive slot key in the motor housing 112 and is driven axially by shaft rotation to thereby move the drive pinion 65-1 axially during motor operation. In this design, the drive pinion 65-1 still moves axially between first and second positions so as to function the same as drive pinion 65.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A power return device for returning a seat assembly for a vehicle from a first position to a second position, wherein said seat assembly is movable forwardly and rearwardly through slide and pitch movements to slide and pitch forwardly when moved from said second position to said first position and to automatically slide and pitch rearwardly when returned to said second position by said power return device, said power return device comprising:
   a gear rack which is stationary during forward and rearward seat movement;
   a drive assembly mountable to said seat assembly and movable along said gear rack during said slide and pitch movements of said seat assembly, said drive assembly comprising:
   a motor;
   at least a first pitch link drivingly connectable to said seat assembly so as to rotate during said pitch movements of said seat assembly;
   a gear set assembly driven by said motor and drivingly connected to said first pitch link to rearwardly drive a return pitch of said seat assembly from said first position to said second position and to rearwardly drive a return slide of said seat assembly from said first position to said second position; and
   said motor being releasably engagable with said gear set assembly wherein said motor is disengaged during forward slide and pitch movements of said seat assembly, and said motor is drivingly engaged with said gear set assembly during return of said seat assembly from said first position to said second position wherein said motor drives said return slide along said gear rack and said return pitch by controlled rotation of said first pitch link.

2. The power return mechanism of claim 1, wherein said first position comprises an easy-entry position and said second position comprises a seating position for said seat assembly.

3. The power return mechanism of claim 2, wherein said gear set assembly comprises a rack pinion engaged with said gear rack and driven by said motor to drive said return slide of said seat assembly along said gear rack from easy-entry position back to said seating position.

4. The power return mechanism of claim 3 wherein said gear set assembly comprises a pitch link drive gear connected to said first pitch link and driven by said motor to drive said return pitch of said seat assembly from said easy-entry position back to said seating position.

5. The power return mechanism of claim 1, wherein said gear set assembly comprises a rack pinion engaged with said gear rack and driven by said motor to drive said return slide as said drive assembly moves along said gear rack, and further comprises a pitch link drive gear connected to said first pitch link and driven by said motor to drive said return pitch of said seat assembly from said first position back to said second position, said motor being operatively engagable with said rack pinion and said pitch link drive gear to drive rotation thereof and effect said automatic return slide and said return pitch of said seat assembly.

6. The power return mechanism of claim 5, wherein said motor is disengaged from said rack pinion and said pitch link drive gear during said forward slide and pitch movements of said seat assembly and is engaged with said rack pinion and said pitch link drive gear to drive rotation thereof during said return slide and said return pitch.

7. The power return mechanism of claim 6, wherein said motor includes a motor drive shaft and a drive pinion which is mounted on said motor drive shaft so as to be axially movable along said motor drive shaft between a disengaged position and an engaged position, said drive pinion being operatively connected with said rack pinion and said pitch link drive gear and rotated by said motor drive shaft when in said engaged position to drive said return slide and said return pitch.

8. The power return mechanism of claim 7, wherein said motor drive shaft includes a helical slot operatively engaged wherein reversible rotation of said motor drive shaft moves said drive pinion between said disengaged and engaged positions, said drive pinion in said engaged position stops its axial movement and begins rotation by said motor drive shaft.

9. The power return mechanism of claim 7, wherein gear set assembly includes a rack pinion drive gear which is in meshed engagement with said rack pinion and said drive pinion when said drive pinion is in said engaged position to operatively engage said drive pinion with said rack pinion to effect return slide and return pitch of said seat assembly.

10. The power return mechanism of claim 1, wherein:
said gear set assembly comprises a rack pinion engaged with said gear rack and a rack pinion drive gear driven by said motor to drive return slide of said drive assembly along said gear rack, and further comprises a pitch link drive gear connected to said first pitch link and driven by said motor to drive said return pitch of said seat assembly from said first position back to said second position;
said motor comprising a motor drive shaft and a drive pinion which is mounted on said motor drive shaft and engaged with said rack pinion drive gear and said pitch link drive gear in an engaged position to effect said return slide and return pitch of said seat assembly during rotation of said motor drive shaft; and
said drive assembly further including a first axial joint defining a first releasable connection between said rack pinion and said rack pinion drive gear, and a second axial joint defining a second releasable connection between said first pitch link and said pitch link drive gear wherein said first and second releasable connections are normally connected to drive said return slide and said return pitch of said seat assembly and intermittently releasable when said seat assembly encounters a hard stop during one or both of said return slide or said pitch slide movements.

11. A power return device for returning a seat assembly for a vehicle from a first position to a second position, wherein said seat assembly is movable forwardly and rearwardly through slide and pitch movements to slide and pitch forwardly when moved from said second position to said first position and to slide and pitch rearwardly when returned to said second position by said power return device, said power return device comprising:
a gear rack which is stationary during forward and rearward seat movement;
a drive assembly mountable to said seat assembly and movable along said gear rack during said slide and pitch movements of said seat assembly, said drive assembly comprising:
a motor;
at least a first pitch link drivingly connectable to said seat assembly so as to rotate during said pitch movements of said seat assembly;
a gear set assembly including a rack pinion and a pitch link drive gear driven by said motor, said pitch link drive gear being drivingly connected to said first pitch link to rearwardly drive a return pitch of said seat assembly from said first position to said second position in response to motor operation, and said rack pinion being drivingly connected to said gear rack to rearwardly drive a return slide of said seat assembly from said first position to said second position in response to motor operation;
said motor being releasably engagable with said rack pinion and said pitch link drive gear wherein said motor is disengaged during forward slide and pitch movements of said seat assembly, and said motor is drivingly engaged during return of said seat assembly from said first position to said second position wherein said motor drives said return slide by said rack pinion travelling along said gear rack and said return pitch by controlled rotation of said first pitch link by said pitch link drive gear; and
said drive assembly further including a first releasable connection in said gear set assembly between said motor and said rack pinion, and a second releasable connection between said first pitch link and said pitch link drive gear wherein said first and second releasable connections are normally connected to drive said return slide and said return pitch of said seat assembly and intermittently releasable when said seat assembly encounters a hard stop during one or both of said return slide or said pitch slide movements.

12. The power return mechanism of claim 11, wherein said gear set assembly comprises a rack pinion drive gear engaged with said rack pinion and driven by said motor to drive return slide of said drive assembly along said gear rack, wherein said first releasable connection is defined by a first axial joint between said rack pinion and said rack pinion drive gear, and said second releasable connection is defined by a second axial joint between said first pitch link and said pitch link drive gear.

13. The power return device of claim 12, wherein said first and second axial joints are defined by friction pads respectively compressed between said rack pinion and said rack pinion drive gear and between said first pitch link and said pitch link drive gear to normally maintain said first and second releasable connections therebetween while permitting intermittent release thereof.

14. The power return device of claim 13, wherein said first and second friction pads are compressed axially and supported on respective support shafts about which said rack pinion and said rack pinion drive gear and said pitch link and said pitch link drive gear rotate during motor operation.

15. The power return device of claim 13, wherein said motor comprises a motor drive shaft and a drive pinion which is mounted on said motor drive shaft and engaged with said rack pinion drive gear and said pitch link drive gear in an engaged position to effect said return slide and return pitch of said seat assembly during rotation of said motor drive shaft.

16. The power return mechanism of claim 15, wherein said drive pinion is mounted on said motor drive shaft so as to be axially movable along said motor drive shaft between a disengaged position and an engaged position, said drive pinion being operatively connected with said rack pinion drive gear and said pitch link drive gear and rotated by said motor drive shaft when in said engaged position to drive said return slide and said return pitch and being separated therefrom when in said disengaged position.

17. The power return mechanism of claim 16, wherein said motor drive shaft includes a helical slot operatively engaged with said drive pinion such that reversible rotation of said motor drive shaft moves said drive pinion between said disengaged and engaged positions wherein said drive pinion in said engaged position stops its axial movement and begins rotation by said motor drive shaft.

18. The power return device of claim 11, wherein said motor comprises a motor drive shaft and a drive pinion which is mounted on said motor drive shaft and selectively drives said rack pinion and said pitch link drive gear when in an engaged position to effect said return slide and return pitch of said seat assembly during rotation of said motor drive shaft.

19. The power return mechanism of claim 18, wherein said drive pinion is mounted on said motor drive shaft so as to be axially movable along said motor drive shaft between a disengaged position and said engaged position, said drive pinion being operatively connected with said rack pinion and said pitch link drive gear and rotated by said motor drive shaft when in said engaged position to drive said return slide and said return pitch.

20. The power return mechanism of claim 19, wherein said motor drive shaft includes a helical slot operatively engaged with said drive pinion wherein reversible rotation of said motor drive shaft moves said drive pinion between said disengaged and engaged positions and said drive pinion in said engaged position stops its axial movement and begins its rotation by said motor drive shaft.

* * * * *